United States Patent Office 3,532,781
Patented Oct. 6, 1970

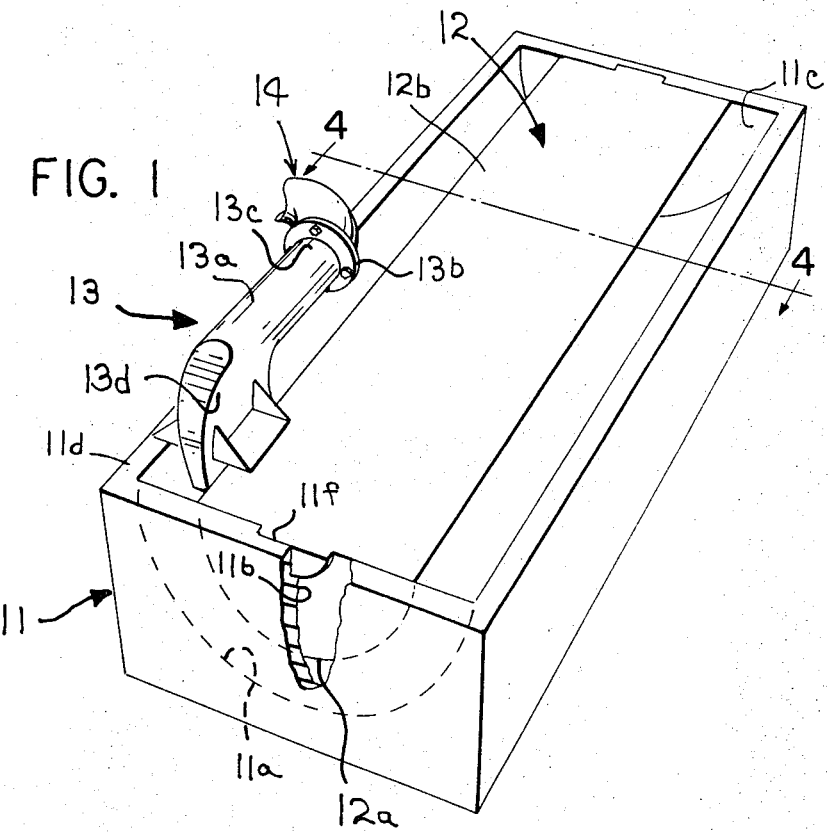
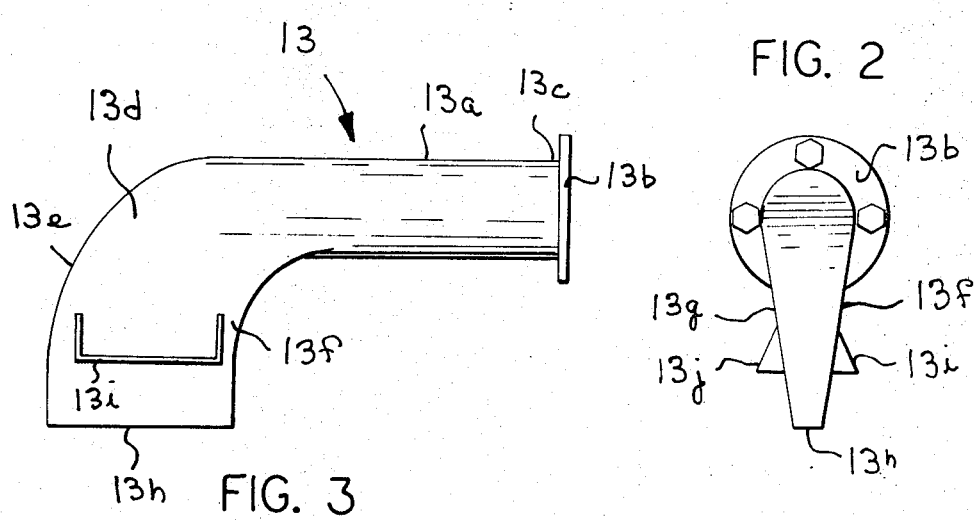

3,532,781
SLURRY POURING METHOD FOR ORIENTING FIBROUS CONSTITUENTS THEREIN
Richard F. Shannon, Lancaster, Ohio, assignor to Owens-Corning Fiberglas Corporation, a corporation of Delaware
Application Dec. 6, 1966, Ser. No. 599,507, now Patent No. 3,458,907, dated Aug. 5, 1969, which is a continuation-in-part of application Ser. No. 286,351, June 7, 1963. Divided and this application Oct. 24, 1968, Ser. No. 801,885
Int. Cl. B28b 1/14, 21/42; B29d 3/02
U.S. Cl. 264—108   3 Claims

ABSTRACT OF THE DISCLOSURE

This disclosure relates to a method of filling a mold with a cementitious slurry prior to the in situ conversion of the slurry to a rigid thermal insulation material wherein the filling of the mold cavity involves flowing the slurry through an inlet passage and discharging the said slurry through a convergent outlet passageway to orient the fibrous constituents lengthwise of the slurry flow.

---

This is a division of application Ser. No. 599,507 filed Dec. 6, 1966, now U.S. Pat. No. 3,458,907 which in turn is a continuation-in-part of application Ser. No. 286,351, filed June 7, 1963, now U.S. Pat. No. 3,296,346.

As will become readily ascertainable from the following description, the present invention relates to novel innovations in slurry pouring means and techniques of the type suitable for use in conjunction with in-situ molding methods or processes wherein aqueous slurries of cementitious constituents, with or without fibrous constituents therein, are poured into cavity-type molds in which the slurries are retained and processed or indurated to convert the slurries into self-supporting bodies of shaped cementitious material. In more particular respects, the present invention pertains to novel pouring nozzle structures especially adapted for utilization in conjunction with methods or processes for molding such cementitious slurries in-situ into bodies of material possessing arcuate, semi-annular, or semi-tubular configurations.

In-situ molding techniques of the type referred to above are quite common, particularly in processes utilized in conjunction with the commercial manufacture of light-weight bodies of shaped or molded thermal insulation materials. Conventionally, such in-situ molding processes, or techniques, involve the initial preparation of an aqueous slurry comprised of reactive quantities of constituent cementitious materials. Control of the density of the final molded material is commonly achieved by regulating the weight ratio of water and solids within a given slurry. For example, for any given slurry, the water-to-solids ratio may be varied throughout a wide range and thus be relied upon as a governing factor in determining the apparent density of the final molded product.

The molding of the slurry is then accomplished by pouring the slurry into one or more cavity-type molds provided with internal molding surfaces conforming essentially to the dimensional and configurational characteristics desired for the resultant molded material. The slurry preparation, while at least initially contained within the mold, in converted or transformed in-situ from a fluid, or semi-fluid, condition to a shaped, self-supporting body of cementitious material. The method or manner of carrying out the in-situ conversion or transformation of the slurry constituents into a self-supporting, or self-sustaining, body of material may vary considerably, depending upon the particular nature of the cementitious constituents of the slurry, and particularly depending upon the reactivity of the cementitious constituents. Moreover, the manner of conducting the in-situ conversion or transformation of the slurry constitutents may vary, depending upon the degree of strength, heat resistance, density, durability, handleability and other particular characteristics necessary or desired to be imparted to the final molded product.

One method suitable for such conversion or transformation involves the use of heat. This manner of conversion, or transformation, is commonly promoted by subjecting the slurry, while within the cavity-type mold, to elevated temperatures and pressures mutually coordinated to prevent ebullition of the aqueous constituent of the slurry medium. When the conversion, or transformation, has progressed sufficiently to convert the slurry constituents into an integrated self-supporting body of shaped material having sufficient strength that it is capable of being removed from the mold without impairment of the unity or shape of the material, it may be, and ordinarily is, removed from the mold and either dried to its final form or further hardened by additional exposure to elevated temperatures and pressures prior to drying. A process of the foregoing type particularly suitable for the conversion of slurries of calcareous and siliceous types of cementitious materials into shaped bodies of light-weight insulation material is set forth in more specific detail in U.S. Pat. No. 1,932,971, issued Oct. 31, 1933, and also in U.S. Pat. No. 2,665,996, issued Jan. 12, 1954.

Another method commonly employed for in-situ conversion or transformation of reactive magnesic and siliceous types of cementitious materials is described with great particularity in U.S. Pat. No. 2,609,733, issued Sept. 9, 1952. According to this latter method, the cementitious slurry constituents are, after partial curing, substantially dewatered in a suction-type filter mold, or compression mold, and thereafter indurated by exposure to heat which is first supplied from hot water followed by exposure to elevated temperatures in a drying oven.

In each of the above-described methods of in-situ molding of cementitious slurries, as well as other commonly known methods too numerous to describe, various types of fibrous constituents are frequently included in the slurry and function to reinforce and strengthen the ultimate product. Among the numerous types of fibrous constituents conventionally utilized for such purposes are straw, asbestos fibers, bagasse, glass fibers and the like. Irrespective of the method or slurry constituents utilized, however, the strength and insulating qualities of the ultimate product for any given process, composition and density is dependent in large measure upon the degree of homogeneity and integrality obtained in the final product. As a corollary, the degree of homogeneity and integrality of the final product is in turn a direct result of the degree of homogeneity and integrality possessed by the slurry immediately prior to and during the conversion or transformation of the slurry to an immobile or self-sustaining physical condition. As otherwise stated, defects in the homogeneity and uniformity of the slurry which exist during the conversion or transformation phase appear as related defects adversely affecting the strength, unity, and insulating characteristics of the final product. Ordinarily, such slurry defects result prior to or during the course of pouring the slurry into the mold and become manifest in the form of slip planes, pouring folds, air pockets and non-uniform distribution of the slurry constituents and reinforcing fibers, all of which tend to inhibit the attainment of the potential and optimum physical properties desired in the final product. Another significant defective condition, or at least non-desirable condition, which ordinarily attends the formation of molded cementitious materials is the complete disarray and lack of proper orientation of the fibrous constituents of the slurry. Obviously, such disarray of the fibrous constituents tends to seriously decrease the potential or optimum strengthening affect of the fibers which would otherwise be obtainable if the fibers were predominantly oriented transversely with respect to the planes of weakness in the product. Additionally, where a low coefficient of thermal conductivity is desired, such fiber disarray is quite detrimental since those fibers which are disposed depthwise of the product tend to act as thermal conductors aiding the flow of heat through the product.

Heretofore, during the mold filling stage of in-situ molding processes, ordinarily little concern has been relegated to the pouring or mold filling aspect, other than to ascertain that the requisite amount of slurry has been introduced into the mold. Commonly, the slurry is either pumped or fed by gravity from a slurry mixing chamber through a flexible hose, chute, or similar device, and thereby directed into the mold which is to be filled. As the slurry issues from the pouring device, it flows into the mold substantially unrestricted, except for the confining walls of the mold. Thereafter, the slurry spreads out into a laminar stream within the mold and fills the mold in an indiscriminate and fortuitous manner. However, since cementitious slurries are commonly thick and plastic or semi-plastic in character, the laminar stream of slurry overlaps and courses over other portions of the slurry within the mold and produces interfacial defects such as pouring folds, air pockets and interfacial slip planes. Similar results develop when the pouring device is directed from one portion of the mold cavity to another during the filling or pouring operation since such redirectioning gives rise to a layered build up of the slurry within the mold with insufficient physical intermixing of the layers or overlapping streams of slurry.

The aforementioned mold filling or pouring methods also provide little, if any, desirable orientation of the fibrous constituents of the slurry. More particularly, the most effective hinging strength, impact strength and modulus of rupture are obtainable by uniformly distributing and orienting the fibrous constituents in such manner that the fibrous constituents are predominantly arranged transversely of the thickness of the product or, alternatively stated, in generally parallel relationship with the major surfaces of the final product. In this manner, the reinforcing fibers provide greatest resistance to cracking, fracturing and separation of the final product since the reinforcing fibers are predominantly distributed and arrayed transversely to the planes of stress accompanying bending and impact forces to which the final product may be subjected during use. Additionally, where the cementitious material is intended for ultimate use as an insulation material, the predominant orientation of the fibrous constituents in planes situated transverse to the path or direction of heat flow through the body of material is extremely important in obtaining enhanced insulating characteristics, since the thermal conductivity of the fibers ordinarily is greater than that of the body of material in which they are embedded. Thus, the tendency of the fibers to act as thermal conductors when situated or arranged lengthwise through the thickness of the material is effectively suppressed. By conventional pouring techniques, however, predominant fiber distribution and lengthwise orientation in the more desirable planes of the final product is practically incapable of any uniform or prediscernible attainment. Consequently, in order to achieve the requisite strength in the product, excessive quantities of reinforcing fibers must be utilized. As an attendant result, more fibers are disposed lengthwise through the thickness of the material and the overall K-factor of the material is increased to the detriment of the insulating value of the product.

It has been determined that in a great number of instances the aforementioned disadvantaged resulting from pouring defects and deficient fiber alignment and orientation such as occur in conventional in-situ types of molding of cementitious slurries may be effectively obviated by providing a slurry pouring nozzle comprising a tubular body portion and having a discharge end formed with a convergent end portion through which to partially restrict the slurry during the passage thereof through the pouring nozzle and into the mold cavity. Such a pouring nozzle structure is described in my copending U.S. patent application Ser. No. 286,351, now U.S. Pat. No. 3,296,346 issued January 3, 1967. However, as described in my aforesaid copending patent application, the molding of bodies of cementitious materials into arcuate, semi-annular, or semi-tubular shapes, such as are commonly employed as thermal insulating bodies for curved surfaces such as high temperature steam lines, and the like, requires that the pouring nozzle be employed to fill the mold prior to the insertion of another molding member into the mold cavity and with which to finally provide the desired arcuate shape to the mold cavity. According to common prior art terminology, the mold member which is introduced into the filled cavity mold to complete the shaping of the mold cavity is called a core, or core member. Additionally, this type of mold filling operation is commonly referred to as a "cores-out" type of mold filling operation. However, it is frequently desirable to form such arcuate bodies of insulation materials by a mold filling method or process commonly referred to as a "core-in" method. In the latter method, the core member is nested within the cavity mold prior to the commencement of the filling operation. It is thus in keeping with achieving the beneficial results obtainable through the utilization of a pouring nozzle of the general structural character described in my aforesaid copending application and at the same time obtaining such benefits in conjunction with a "cores-in" filling operation, that the present invention is primarily concerned and directed.

Accordingly, it is an object of the present invention to provide means for improving the quality of molded cementitious materials prepared by in-situ slurry molding techniques.

Another object of the present invention is to provide an improved method and means for pouring a cementitious slurry into a mold.

Another object o fthe present invention is to provide a method and means for pouring a slurry of cementitious materials into a mold which accomplishes such pouring in a manner tending to obviate the formation of pouring folds, slip planes, air pockets and other pouring defects.

An additional object of the present invention is to provide a method and apparatus for pouring a slurry of cementitious and fibrous constituents into a mold in such manner that the fibrous constituents are predominantly oriented and distributed in a predetermined arrangement within the mold concurrently with the pouring of the slurry.

A further objective of the present invention is to provide a method and means of improving the strength of products prepared from slurries of cementitious materials.

A more particular objective of the present invention is the provision of a method and means for pouring a slurry of cementitious materials into a molding cavity having an elongated, semi-circular configuration provided by a cavity mold in nested cooperation with removable mold core whereby a "cores-in" mold filling operation may be carried out in conjunction with a manner of pouring which tends to obviate the formation of pouring folds, slip planes, air pockets and other pouring defects.

Another more particular objective of the present invention is the provision of pouring means for use in filling a cavity mold having the characteristics of the last-mentioned objective and which when used in conjunction with a slurry having fibrous constituents will tend to orient predominant quantities of the fibrous constituents in a predetermined pattern while the slurry is being poured into the cavity mold.

Other objects, as well as other aspects and advantages of the present invention, together with the specific nature thereof, will become apparent from the following detailed description taken in conjunction with the annexed sheets of drawings on which, by way of example only, the preferred embodiments of the invention are illustrated, and whereon:

FIG. 1 is a perspective view depicting one preferred embodiment of the present invention and showing the functional aspect thereof in conjunction with a cavity mold of the type suitable for use in "cores-in" forming of semi-tubular bodies of cementitious insulation material;

FIG. 2 is a front elevational view of the pouring nozzle characterized in the embodiment of the invention shown in FIG. 1;

FIG. 3 is a side elevational view of the pouring nozzle illustrated in FIG 2;

In accordance with conventional procedures, the slurry is first prepared in a suitable mixing chamber or hopper which may partake of the manner of preparation set forth in the previously mentioned U.S. Pat. Nos. 1,932,971, 2,665,996 and 2,609,733, among others. Thereafter, the slurry is ready to be poured and molded.

Figure 4:
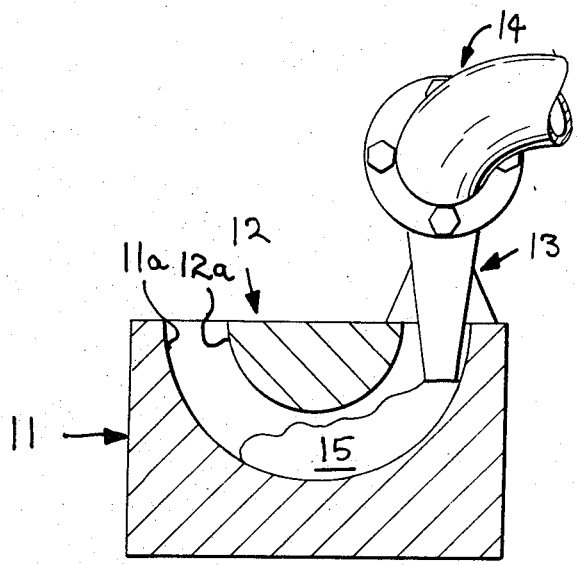
FIG. 4 is a sectional view taken substantially along the plane of the line 4—4 in FIG. 1.

In molding arcuate, semi-annular, or semi-tubular bodies of cementitious materials, or the like, such as, for example, are commonly utilized for insulating furnaces, boilers, steam pipes, heating ducts, and the like, it is customary to mold the slurry of cementitious materials in a partible mold in which one mold part defining an elongated arcuate molding surface and another mold part defining a smaller arcuate molding surface are concentrically nested in spaced peripheral alignment and cooperate to define therebetween an arcuate molding space or molding cavity. A typical mold of this type is illustrated in perspective aspect in FIG. 1. As illustrated, the mold includes a cavity mold 11 which may have an elongated, generally rectangular outer construction and which defines a substantially semi-circular interior molding surface 11a extending lengthwise of the mold between closed opposite mold end walls 11b and 11c. Nested concentrically within the cavity mold 11 and in peripherally spaced co-axial alignment with the molding surface 11a, there is an axially elongated core member 12. As best illustrated in FIG. 4, the interior molding surface 11a of the cavity mold 11 and the exterior molding surface 12a of the core member 12 cooperate to define an arcuate molding cavity therebetween which is particularly suitable for the formation of a semi-tubular body of molded cementitious material. Proper concentric alignment and seating of the molding surface 12a with respect to molding surface 11a may be accomplished in conventional manner by providing core aligning and supporting means at each end of the cavity mold 11 for gravitationally supporting opposite axial ends of the core member 12. One conventional form of such means is shown in FIG. 1 in the form of a guide slot or groove 11f; one of which, although only clearly shown at one end wall 11b, is also provided in the opposite end wall 11c.

With the core 12 in properly aligned and concentrically nested position within the cavity mold 11, the "cores-in" filling of the mold may be commenced by the introduction of the cementitious slurry into the annular cavity between the molding surfaces 11a and 12a. The slurry is directed into the annular cavity through a pouring nozzle 13 which is particularly adapted and constructed to accommodate filling of the mold cavity 11 with the core member 12 in position. As illustrated, the pouring nozzle 13 includes a hollow central body portion or pouring tube 13a which has an inlet end adapted for axial connection to the discharge end of a flexible hose 14, as by mating flanges, indicated generally at 13b, or other suitable means, provided on the interconnected ends of the hose 14 and the nozzle 13. As best viewed in FIGS. 2 and 3, the pouring tube 13a is formed with a generally cylindrical inlet end portion 13c and a turned and laterally offset discharge end portion 13d having a rounded end wall 13e and side walls 13f and 13g which progressively converge together to partially restrict the flow of slurry and also flatten out in the direction of slurry flow to terminally define a generally rectangular discharge opening, or discharge orifice 13h. Disposed outwardly from opposite sides of the discharge end portion 13d, there is a pair of guide flanges 13i and 13j which are arranged to laterally span the gap between the side wall rim 11d of the cavity mold 11 and the flat upper edge surface 12b of the core member 12. As shown, the laterally disposed guide flanges 13i and 13j are arranged to slidably ride along the side wall rim 11d and the upper edge surface 12b and accommodate gravitationally supported and guided travel of the pouring nozzle 13 as it is gradually manipulated from one end to the other end of the mold.

In accordance with a preferred manner of use, the pouring nozzle 13 is initially seated adjacent to one end of the mold cavity, such as is indicated by the position indicated in FIG. 1. The slurry pouring operation is then commenced and slurry 15 is permitted to be discharged from the pouring nozzle into the mold cavity. As the slurry issues from the discharge end 13d of the pouring nozzle, it is emitted, as best shown in FIG. 4, in a path of travel directed cross-wise, or transversely, of the mold cavity. Of course, to a lesser extent, the slurry tends to flow somewhat, as it fills the mold cavity, in a direction or path of travel disposed lengthwise of the mold cavity. However, it is important to bear in mind that, as will be further discussed hereinafter, in either event the path of travel of the slurry, coupled with the frictional effect of the molding surfaces 11a and 12a thereon, tends to predominantly orient such fibrous constituents as may be in the slurry in paths disposed in planes which are essentially parallel to the concentric molding surfaces 11a and 12a.

Figure 6:
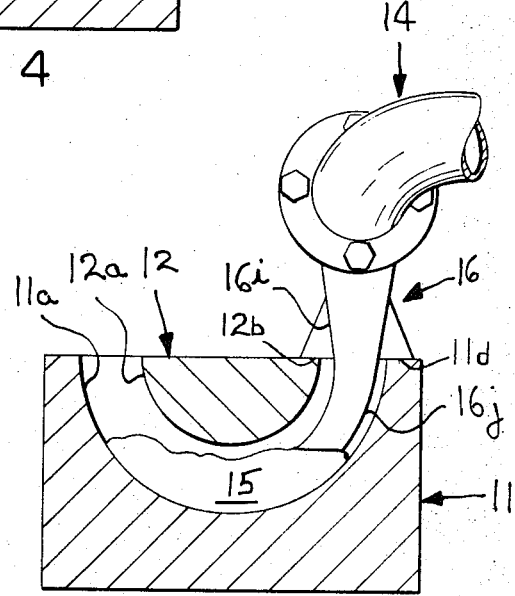
FIG. 6 is a sectional view similar to FIG. 4, but showing the mold being filled with the modified form of pouring nozzle illustrated in FIG. 5.
Figure 5:
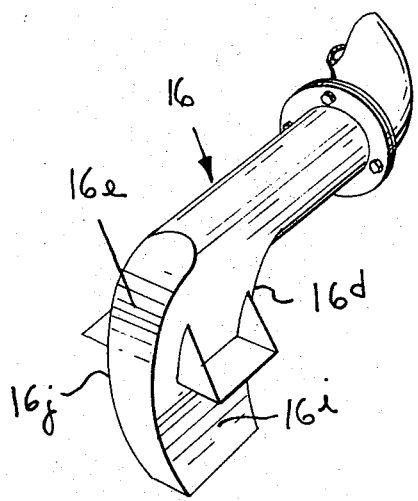
FIG. 5 is a perspective view illustrating a modification of the pouring nozzle represented in FIGS. 1–4.

It has, in certain instances, been found to be desirable to utilize a modified form of the pouring nozzle previously described. Such a modified form is depicted in FIGS. 5 and 6, wherein the discharge end of the pouring nozzle, in addition to gradually converging together, are also curved. As shown, the modified form of pouring nozzle, designated as 16, has an offset discharge end 16d with a curved end wall 16e, like the end wall 13e of the pouring nozzle 13, which curves in a longitudinal direction from the pouring nozzle. Additionally, however, arcuate side walls 16i and 16j are provided which progressively converge towards each other. By virtue of this modified form of pouring nozzle, the slurry immediately prior to being discharged from the pouring nozzle is directioned in an arcuate path essentially concentric to the arcuate configuration of the molding surfaces 11a and 12a. Thus, the tendencies of the slurry to impinge upon the molding surface 11a and disrupt the continuity of the stream of slurry or preoriented disposition of the fibrous slurry constituents are substantially reduced. Moreover, there is less tendency for the slurry to become obstructed while flowing cross-wise of the mold between the molding surfaces 11a and 12a.

However, irrespective of which of the foregoing types of pouring nozzles are employed in the "cores-in" method of in-situ molding of cementitious slurries, it has been found that the resultant molded product exhibits highly desirable and improved characteristics, among others, of strength, insulating value and appearance. Additionally, the molded product ordinarily possesses substantially fewer pouring defects, such as slip-planes, pouring folds, non-homogeneity, air-holes, and the like, than is ordinarily obtainable with conventional pouring techniques and apparatus. Moreover, irrespective of whether the pouring nozzle is formed with a convergent discharge end having flat or curved side walls, the convergent nature of the side walls of the discharge end of the pouring nozzle tends to constrict and flatten out the stream of slurry as it passes therethrough and is discharged into the cavity between the mold and core. Such action, together with the relatively increased frictional resistance between the interior surfaces of the pouring nozzles and the slurry, tends to align and orient the fibrous constituents predominantly in lengthwise relationship to the slurry flow. Also, the constricting action and the increased frictional resistance of the pouring nozzles impart substantial kneading and intermixing of the slurry constituents which results in an attendant dissipation of pouring folds, slip planes, air pockets, and the like, which may be present in the slurry when it is delivered to the inlet end of the pouring nozzle.

Further, by virtue of the foregoing method and apparatus, it is possible to regulate, to a predominant degree, the alignment of the fibrous constituents of the slurry in such manner that optimum orientation of the fibers is regularly achieved within the slurry in the mold. In this respect, the fibrous constituents are predominantly situated in planar relationship relative to the molded faces of the ultimate molded product. Otherwise stated, the extent of fibers displaced depthwise or transversely of the molded faces of the ultimate product is substantially minimized. Consequently, the impact strength, modulus of rupture, and hinging strength of the product are substantially enhanced, while at the same time the overall coefficient of thermal conductivity of the product is perceptibly reduced.

Having now described the foregoing invention in substantial detail, it will, of course, be understood that various details of construction herein described may be modified throughout a wide range of equivalents and that the various steps in the method of use of the described construction may be varied considerably without departing from the principles of this invention, and it is, therefore, not the purpose to limit the invention hereon otherwise than as necessitated by the scope of the appended claims.

I claim:
1. A "cores-in" method of filling a mold with a slurry of cementitious and fibrous constituents using a cavity mold provided with closed end walls and side walls defining a substantially uniform, upwardly opening and generally U-shaped transverse internal molding surface throughout the length thereof, a core member assembled within said cavity mold prior to filling and having a molding surface in peripherally spaced relationship with and concentrically conforming to the molding surface of said cavity mold to define therewith a molding cavity having a cross-sectional configuration definitive of an annular segment extending lengthwise of the mold assembly, and comprising the steps of filling said mold cavity by flowing the slurry through an inlet passageway having a substantially uniform cross section; discharging the slurry through a convergent partially restricted outlet passageway to orient the fibrous constituents lengthwise of the slurry flow, and directing the discharged, oriented fibrous slurry into said molding cavity along paths predominantly paralleling said concentrically conforming molding surfaces.

2. A method in accordance with claim 1, including flowing the slurry through an arcuate, convergent, partially restricted outlet passageway.

3. A method in accordance with claim 2, wherein said arcuate passageway is disposed in essentially concentric relationship with the cross-sectional configuration of said molding cavity.

References Cited
UNITED STATES PATENTS

| | | | |
|---|---|---|---|
| 2,842,799 | 7/1958 | Politzer | 264—108 X |
| 3,198,867 | 8/1965 | Siggers et al. | 264—108 X |
| 3,296,346 | 1/1967 | Shannon | 264—108 |

ROBERT F. WHITE, Primary Examiner

J. R. THURLOW, Assistant Examiner

U.S. Cl. X.R.

25—32, 126; 249—11; 264—299, 333